United States Patent
Lin et al.

(10) Patent No.: US 9,723,634 B2
(45) Date of Patent: Aug. 1, 2017

(54) RANDOM ACCESS PREAMBLE FOR MINIMIZING PA BACKOFF

(71) Applicant: Telefonaktiebolaget LM Ericsson (publ), Stockholm (SE)

(72) Inventors: Xingqin Lin, San Jose, CA (US); Ansuman Adhikary, Santa Clara, CA (US); Asbjörn Grövlen, Stockholm (SE); Dennis Hui, Sunnyvale, CA (US); Niklas Johansson, Sunnyvale, CA (US); Yutao Sui, Solna (SE); Mårten Sundberg, Årsta (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/277,386

(22) Filed: Sep. 27, 2016

(65) Prior Publication Data

US 2017/0094689 A1    Mar. 30, 2017

Related U.S. Application Data

(60) Provisional application No. 62/233,822, filed on Sep. 28, 2015.

(51) Int. Cl.
*H04W 74/08* (2009.01)
*H04W 72/04* (2009.01)

(52) U.S. Cl.
CPC ... *H04W 74/0833* (2013.01); *H04W 72/0453* (2013.01)

(58) Field of Classification Search
None
See application file for complete search history.

(56) References Cited

U.S. PATENT DOCUMENTS

2008/0253279 A1\* 10/2008 Ma ............... H04B 7/0684 370/206
2010/0284487 A1\* 11/2010 Sumasu ............ H04J 11/0083 375/295

(Continued)

FOREIGN PATENT DOCUMENTS

EP    2938153 A1    10/2015
WO    2014110714 A1    7/2014

OTHER PUBLICATIONS

Unknown, Author, "Narrowband LTE—Random Access Design", Ericsson, 3GPP TSG-RAN1 #82bis, R1-156011, Malmö, Sweden, Oct. 5-9, 2015, 1-11.

*Primary Examiner* — Hassan Kizou
*Assistant Examiner* — Hashim Bhatti
(74) *Attorney, Agent, or Firm* — Murphy, Bilak & Homiller, PLLC

(57) ABSTRACT

An example method in a user equipment comprises generating a random access preamble signal and transmitting the random access preamble signal. This generating of the random access preamble signal comprises generating a Single-Carrier Frequency-Division Multiple Access (SC-FDMA) random access preamble signal comprising two or more consecutive preamble symbol groups, each preamble symbol group comprising a cyclic prefix portion and a plurality of identical symbols occupying a single subcarrier of the SC-FDMA random access preamble signal. The single subcarrier for at least one of the preamble symbol groups corresponds to a first subcarrier frequency and the single subcarrier for an immediately subsequent one of the preamble symbol groups corresponds to a second subcarrier frequency.

29 Claims, 15 Drawing Sheets

(56) References Cited

U.S. PATENT DOCUMENTS

| | | | | |
|---|---|---|---|---|
| 2011/0300870 | A1* | 12/2011 | Chun | H04L 5/0007 455/437 |
| 2013/0250922 | A1 | 9/2013 | Kwon et al. | |
| 2014/0044108 | A1* | 2/2014 | Earnshaw | G01S 5/0063 370/336 |
| 2014/0301336 | A1* | 10/2014 | Kim | H04L 5/001 370/329 |
| 2015/0319779 | A1* | 11/2015 | Li | H04L 27/2613 370/329 |
| 2016/0219621 | A1* | 7/2016 | Kim | H04W 56/0005 |
| 2016/0373222 | A1* | 12/2016 | Pralea | H04B 1/707 |
| 2017/0006638 | A1* | 1/2017 | Sahlin | H04J 13/107 |
| 2017/0063589 | A1* | 3/2017 | Chen | H04B 7/0452 |

\* cited by examiner

RANDOM ACCESS PREAMBLE FOR MINIMIZING PA BACKOFF

RELATED APPLICATION

The present application claims priority to and the benefit of U.S. provisional patent application Ser. No. 62/233,822, filed 28 Sep. 2015. The entire contents of the foregoing provisional application are incorporated by reference herein.

TECHNICAL FIELD

The present disclosure is generally related to wireless communications networks, and is more particularly related to random access procedures in an Internet of Things (IoT) supporting machine-type-communication (MTC) devices.

BACKGROUND

Members of the 3$^{rd}$ Generation Partnership Project (3GPP) have agreed to define specifications for what is being called "NB-IoT," which refers to a "narrowband Internet of things." These standards will support wireless communications for low-power equipment that may rely on batteries and that will typically send and receive only small amounts of information. Example applications for wireless devices that support NB-IoT include providing parking meters, industrials sensors, and the like with wireless communication capabilities.

The radio interface for NB-IoT will be designed so that the technology can readily be deployed by operators in portions of their existing Long Term Evolution (LTE) spectrum. Thus, it is expected that certain aspects of the NB-IoT will be defined to make the most possible use of existing LTE hardware, designs, and procedures. However, changes to the LTE specifications are likely to be made at all levels of the specifications, to reduce power consumption, improve coverage, and otherwise provide for improved operation of low-power wireless equipment.

One aspect of the existing LTE specifications is random access. In LTE, as in most communication systems, a mobile terminal may need to contact the network, via the eNodeB (3GPP terminology for an LTE base station), without yet having a dedicated resource in the uplink (from user equipment, UE, to base station). To handle this, a random access procedure is available, whereby a UE that does not have a dedicated uplink resource may transmit a signal to the base station. In the process defined by the 3GPP specifications for LTE, the first message (MSG1 or preamble) of this procedure is transmitted on a special resource reserved for random access, a physical random access channel (PRACH). This channel is limited in time and frequency, as shown in FIG. 1. The resources available for PRACH transmissions are identified to mobile terminals as part of the broadcasted system information or as part of dedicated Radio Resource Control (RRC) signaling in some cases, such as in the case of a handover.

In LTE, the random access procedure is used for a number of different reasons. Among these reasons are:
 initial access, for UEs in the LTE_IDLE or LTE_DETACHED states;
 an incoming handover;
 resynchronization of the uplink;
 a scheduling request, for a UE that is not allocated any other resource for contacting the base station; and
 positioning.

To preserve orthogonality among different user equipments (UEs—3GPP terminology for radio access terminals, including cellular telephones and machine-to-machine radio devices) in an orthogonal frequency-division multiple-access (OFDMA) or single-carrier frequency-division multiple-access (SC-FDMA) system, the time of arrival of each UE signal needs to be within the cyclic prefix (CP) of the OFDM or SC-FDMA signal. It will be appreciated that the term cyclic prefix in background art refers to the prefixing of an OFDM symbol with a repetition of the symbol's end. The cyclic prefix acts as a guard interval, so as to eliminate inter-symbol interference from the previous symbol. It also allows the linear convolution of a channel to be modelled as circular convolution, which can be performed in the frequency domain with a discrete Fourier transform. This frequency-domain processing simplifies demodulation processes in an LTE receiver.

LTE random access can be either contention-based or contention-free. The contention-based random access procedure consists of four steps, as illustrated in FIG. 2. Note that only the first step involves physical-layer processing specifically designed for random access, while the remaining three steps follow the same physical-layer processing used in uplink and downlink data transmission. The eNodeB can order the UE, through a Physical Downlink Control Channel (PDCCH), to perform a contention based random access. The UE starts the random access procedure by randomly selecting one of the preambles available for contention-based random access. The UE then transmits the selected random access preamble on the PRACH to the eNodeB in the Radio Access Network (RAN), shown in FIG. 2 as step 1.

The RAN acknowledges any preamble it detects by transmitting a random access response, which includes an initial grant to be used on the uplink shared channel, a temporary Cell Radio Network Temporary Identification (C-RNTI) for the UE, and a time alignment (TA) update. The TA update is based on the timing offset of the preamble measured by the eNodeB on the PRACH. The random access response is transmitted in the downlink to the UE (step 2) and its corresponding PDCCH message cyclic redundancy code (CRC) is scrambled with a Random Access Radio Network Temporary Identifier (RA-RNTI).

After receiving the random access response, the UE uses the grant to transmit a message back to the RAN (step 3). This message is used, in part, to trigger the establishment of RRC and in part to uniquely identify the UE on the common channels of the cell. The timing advance command that was provided to the UE in the random access response is applied in the UL transmission in message transmitted back to the RAN. The eNodeB can change the resources blocks that are assigned for transmission of this message of step 3 by sending a UL grant having its CRC scrambled with a Temporary Cell Radio Network Temporary Identifier (TC-RNTI).

The procedure ends with the RAN solving any preamble contention that may have occurred for the case that multiple UEs transmitted the same preamble at the same time. This can occur when each UE randomly selects when to transmit and which preamble to use. If multiple UEs select the same preamble for the transmission at the same time on the Random Access Channel (RACH), there will be contention between these UEs. The RAN resolves this contention using the contention resolution message, seen as step 4 in FIG. 2. This message, which is sent by the eNodeB for contention resolution, has its PDCCH CRC scrambled with the C-RNTI if the UE previously has a C-RNTI assigned. If the UE does not have a C-RNTI previously assigned has its PDCCH CRC is scrambled with the TC-RNTI.

A scenario where contention occurs is illustrated in FIG. 3, where two UEs transmit the same preamble, $p_5$, at the same time. A third UE also transmits a random access preamble at the same time, but since it transmits with a different preamble, $p_1$, there is no contention between this UE and the other two UEs.

For contention-free random access, the UE uses reserved preambles assigned by the base station. In this case, contention resolution is not needed, and thus only steps 1 and 2 of FIG. 2 are required. A non-contention-based random access or contention-free random access can be initiated by the eNodeB, for example, to get the UE to achieve synchronization in the uplink. The eNodeB initiates a non-contention-based random access either by sending a PDCCH order or indicating it in an RRC message. The latter of these two approaches is used in the case of a handover.

The procedure for the UE to perform contention-free random access is illustrated in FIG. 4. As with the contention-based random access, the random access response is transmitted in the downlink to the UE and its corresponding PDCCH message CRC is scrambled with the RA-RNTI. The UE considers the contention resolution successfully completed after it has received the random access response successfully. For the contention-free random access, as for the contention-based random access, the random access response contains a timing alignment value. This enables the eNodeB to set the initial/updated timing according to the UEs transmitted preamble.

Efforts currently underway with respect to the so-called Networked Society and Internet of Things (IoT) are associated with new requirements on cellular networks, e.g., with respect to device cost, battery lifetime and coverage. To drive down device and module cost for the small wireless devices that are expected to become ubiquitous, using a system-on-a-chip (SoC) solution with integrated power amplifier (PA) is highly desirable. However, it is currently feasible for state-of-the-art PA technology to allow only about 20-23 dBm transmit power when the power amplified is integrated to the SoC. This constraint on output power from the SoC solution limits uplink coverage, which is related to how much the path loss is allowed between the user terminal and base station.

Further, to maximize the coverage achievable by an integrated PA, it is necessary to reduce PA backoff. PA backoff is needed when the communication signal has a non-unity peak-to-average power ratio (PAPR), i.e., when the communication signal is not a constant envelope signal. To avoid spurious signals and out-of-band emissions from the PA when amplifying a non-constant-envelope signal, the PA must be operated at or near its linear operating region, i.e., it must be "backed off" from its high-efficiency, non-linear operating region. The higher the PAPR is, the higher the PA backoff required. Because higher PA backoff gives rise to lower PA efficiency, it lowers device battery life time. Thus, for wireless IoT technologies, designing an uplink communication signal that has as low PAPR as possible is critically important for achieving the performance objectives for IoT devices with respect to device cost, battery lifetime and coverage.

SUMMARY

Currently 3GPP is standardizing Narrow-band IoT (NB-IoT) technologies. There is a strong support from the existing LTE eco-system (vendors and operators) for evolving existing LTE specifications to include the desired NB-IoT features. This is motivated by the time-to-market consideration, since an LTE based NB-IoT solution can be standardized and developed in a shorter time frame. A leading candidate for NB-IoT is a LTE-based NB-LTE solution.

The LTE uplink (mobile-station-to-base-station transmissions) is based on single-carrier frequency-division multiple-access (SC-FDMA) modulation for the uplink data and control channels. For random access preamble transmission, a Zadoff-Chu signal is used. Neither of these signals has good PAPR properties.

To resolve this problem, a new random access preamble signal is disclosed herein. This signal is appropriate for the physical random access channel (PRACH) of NB-IoT. The new PRACH signal achieves 0 dB PAPR, and thus eliminates the need for PA backoff and maximizes PA efficiency. The new PRACH signal is compatible with the use of SC-FDMA and/or orthogonal frequency-division multiple-access (OFDMA) for transmissions of uplink data and control channel signals, since the new PRACH signal, in any given OFDM symbol interval, looks like an OFDM signal occupying only a single subcarrier. Note that for a single subcarrier signal, an OFDM signal is identical to the corresponding SC-FDMA signal.

Since the new PRACH signal achieves 0 dB PAPR, it eliminates the need for PA backoff and maximizes PA efficiency. Thus, it maximizes the PRACH coverage and battery efficiency. The new PRACH signal is compatible with SC-FDMA and orthogonal frequency-division multiple-access (OFDMA). Thus, it can be easily implemented using existing SC-FDMA or OFDMA signal generator. This reduces both development cost and time-to-market.

According to some embodiments, a method in a user equipment includes generating a Single-Carrier Frequency-Division Multiple Access (SC-FDMA) random access preamble signal comprising two or more consecutive preamble symbol groups, each preamble symbol group comprising a cyclic prefix portion and a plurality of identical symbols occupying a single subcarrier of the SC-FDMA random access preamble signal. The generating of the SC-FDMA random access preamble signal is done such that the single subcarrier for at least one of the preamble symbol groups corresponds to a first subcarrier frequency and the single subcarrier for an immediately subsequent one of the preamble symbol groups corresponds to a second subcarrier frequency. The method further comprises transmitting the SC-FDMA random access preamble signal. In some cases, the method may include selecting a preamble configuration from a plurality of pre-determined preamble configurations, wherein the selected preamble configuration defines the first and second subcarrier frequencies.

According to some embodiments, a method in a base station includes receiving a radio-frequency signal and detecting, in the radio-frequency signal, an SC-FDMA random access preamble signal, transmitted by a first remote user equipment, where the first SC-FDMA random access preamble signal comprises two or more consecutive preamble symbol groups. Each preamble symbol group comprises a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency. In some cases, the method includes estimating a time-of-arrival for the first preamble signal.

According to the embodiments summarized, a single subcarrier signal is used in any OFDM symbol interval of the random access preamble signal. In different OFDM symbol intervals, different subcarrier (frequencies) may be used. This can be thought of as frequency hopping. This can be used ensure phase continuity between transitions (thus there is relationship between CP duration, nominal data symbol duration, and hopping distance in frequency). In other embodiments, orthogonal frequency-hopping patterns are designed between different PRACH preambles, so that the random access preamble signals from different devices are orthogonally multiplexed and separately detectable by the receiving base station.

According to some embodiments, a user equipment includes a radio transceiver adapted to communicate with another user equipment and one or more processing circuits adapted to carry out the methods in the user equipment described above. Likewise, an example base station comprises a radio transceiver adapted to communicate with one or more remote user equipments, and one or more processing circuits adapted to carry out the methods in the base station described.

Further embodiments may include computer program products and non-transitory computer readable media that store instructions that, when executed by processing circuit, perform the operations of the embodiments describe above.

Details of several embodiments of techniques and apparatuses for performing random access procedures are described and illustrated below.

DETAILED DESCRIPTION

Figure 1:
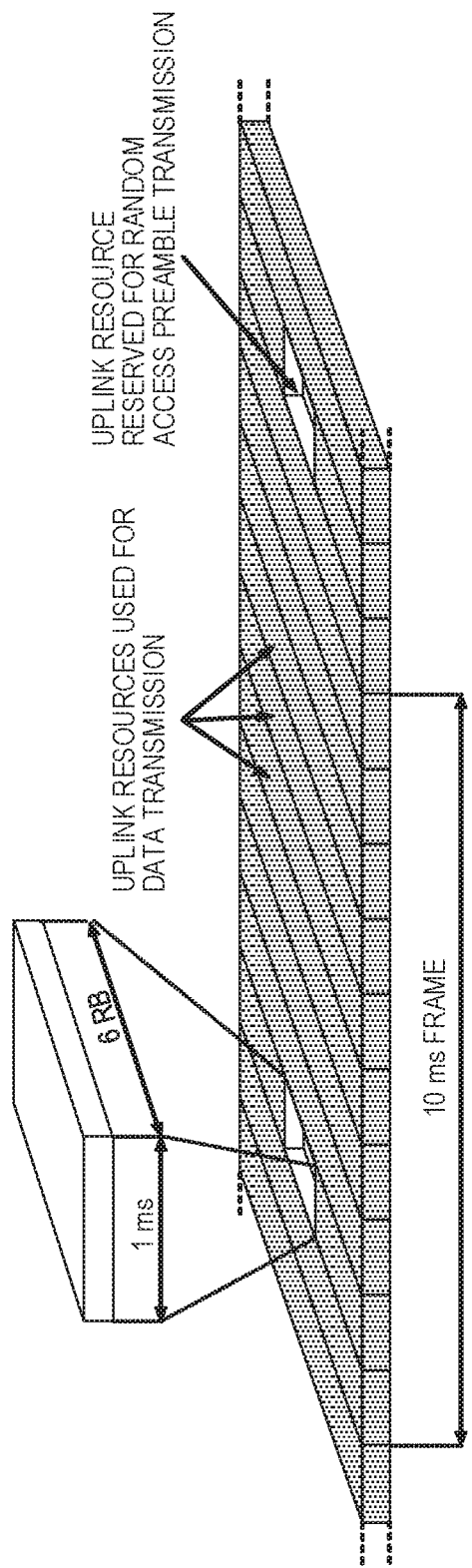
FIG. 1 is a diagram illustrating random access preamble transmission.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, embodiments of the present inventive concepts are described herein in the context of operating in or in association with a RAN that communicates over radio communication channels with mobile terminals, also interchangeably referred to as wireless terminals or UEs, using a particular radio access technology. More specifically, embodiments are described in the context of the development of specifications for NB-IoT, particularly as it relates to the development of specifications for NB-IoT operation in spectrum and/or using equipment currently used by E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

Note that in some of the embodiments described herein, the terms "user equipment" and "UE" are used. A UE, as that term is used herein, can be any type of wireless device capable of communicating with a network node or another UE over radio signals. In the context of the present disclosure, it should be understood that a UE may refer to a machine-to-machine (M2M) device, a machine-type communications (MTC) device, and/or a NB-IoT device, where the UE has no "user" in the sense of an individual person owning and/or operating the device. A UE may also be referred to as a wireless device, a radio device, a radio communication device, a wireless terminal, or simply a terminal—unless the context indicates otherwise, the use of any of these terms is intended to include device-to-device UEs, machine-type UEs or UEs capable of machine-to-machine communication, sensors equipped with a UE, wireless-enabled table computers, mobile terminals, smart phones, laptop-embedded equipped (LEE), laptop-mounted equipment (LME), USB dongles, wireless customer-premises equipment (CPE), etc. In the discussion that follows, the terms machine-to-machine (M2M) device, machine-type communication (MTC) device, wireless sensor, and sensor may also be used. It should be understood that these devices are UEs, but are generally configured to transmit and/or receive data without direct human interaction.

In the existing LTE random access design, random access serves multiple purposes such as initial access when establishing a radio link, scheduling request, etc. Among others, a main objective of random access is to achieve uplink synchronization, which is important for maintaining the uplink orthogonality in LTE. To preserve orthogonality among different user equipments (UEs) in an OFDM or SC-FDMA system, the time of arrival of each UE signal needs to be within the cyclic prefix (CP) of the OFDM or SC-FDMA signal.

Figure 5:
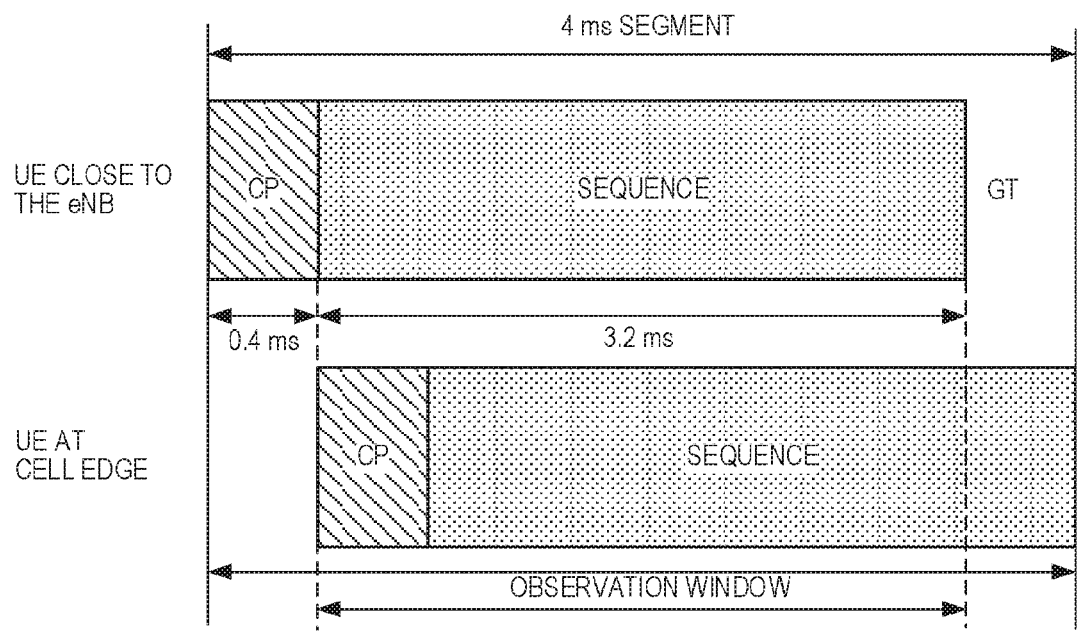
FIG. 5 is a diagram illustrating a cyclic prefix, guard period and preamble sequence for PRACH.

As discussed in the Background section above, a cyclic prefix (CP) is used to provide a guard time between consecutive symbols and, especially in the context of OFDMA and/or SC-FDMA transmissions, to simplify the receiver processing. FIG. 5 illustrates how a CP could be used for a transmitted OFDMA/SC-FDMA symbol that forms all or part of physical random access channel (PRACH) preamble sequence. As shown in FIG. 5, a PRACH preamble sequence is sent by the UE during a random access time segment illustrated in FIG. 5. In the illustrated example, the transmission has a duration of 3.6 milliseconds, including a CP duration of 400 microseconds and a data interval of 3.2 milliseconds. The PRACH preamble sequence does not occupy the entire random access segment, leaving some time as guard time and also allow a cyclic prefix (CP) interval.

As discussed above, 3GPP is defining specifications for NB-IoT, which will support wireless communications for low-power equipment that may rely on batteries and that will typically send and receive only small amounts of information. It is desirable that the specifications for NB-IoT, where possible, facilitate the re-use of existing designs and techniques, and facilitate deployment in existing LTE spectrum. The previously existing LTE uplink (mobile-station-to-base-station transmissions), however, is based on single-carrier frequency-division multiple-access (SC-FDMA) modulation for the uplink data and control channels. For random access preamble transmission, a Zadoff-Chu signal is used. Neither of these signals has good PAPR properties, however, which creates problems for low-power ad low-cost devices, especially those relying on an integrated system-on-chip (SoC) system.

To resolve this problem, a new random access preamble signal is disclosed herein. This signal is appropriate for the physical random access channel (PRACH) of NB-IoT. The new PRACH signal achieves 0 dB PAPR, and thus eliminates the need for PA back-off and maximizes PA efficiency. The new PRACH signal is compatible with the use of SC-FDMA and/or orthogonal frequency-division multiple-access (OFDMA) for transmissions of uplink data and control channel signals, since the new PRACH signal, in any given OFDM symbol interval, looks like an OFDM signal occupying only a single subcarrier. Note that for a single subcarrier signal, an OFDM signal is identical to the corresponding SC-FDMA signal.

Since the new PRACH signal achieves 0 dB PAPR, it eliminates the need for PA back-off and maximizes PA efficiency. Thus, it maximizes the PRACH coverage and battery efficiency. The new PRACH signal is compatible with SC-FDMA and orthogonal frequency-division multiple-access (OFDMA). Thus, it can be easily implemented using existing SC-FDMA or OFDMA signal generator. This reduces both development cost and time-to-market.

In FIG. 5, two PRACH preamble transmissions are shown, with one coming from a UE close to the eNB (LTE terminology for a node that includes radio base station functionality) and the other from a UE far from the base station, at the cell edge. It can be seen that this results in a difference in timing for the two transmissions, relative to a random access interval maintained in the eNB receiver.

The use of the CP allows the receiver to perform a circular convolution using, in this example, a 3.2-millisecond portion of the signal, centered in a 4-millisecond random access interval window. The eNB receiver will have similar performance for both the near-eNB and near-cell-edge cases.

As discussed earlier, to maximize PA efficiency and coverage, it is desirable to have PRACH preambles as close to constant-envelope as possible. A constant-envelope signal has 0 dB PAPR, and does not require PA back-off. In the below description, we will use PRACH signal and PRACH preamble interchangeably.

Figure 2:
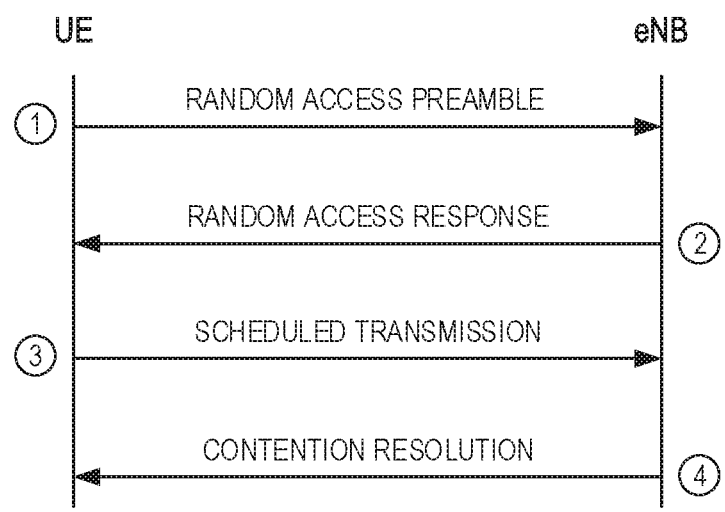
FIG. 2 is a diagram illustrating signaling for the contention-based random access procedure in LTE.
Figure 3:
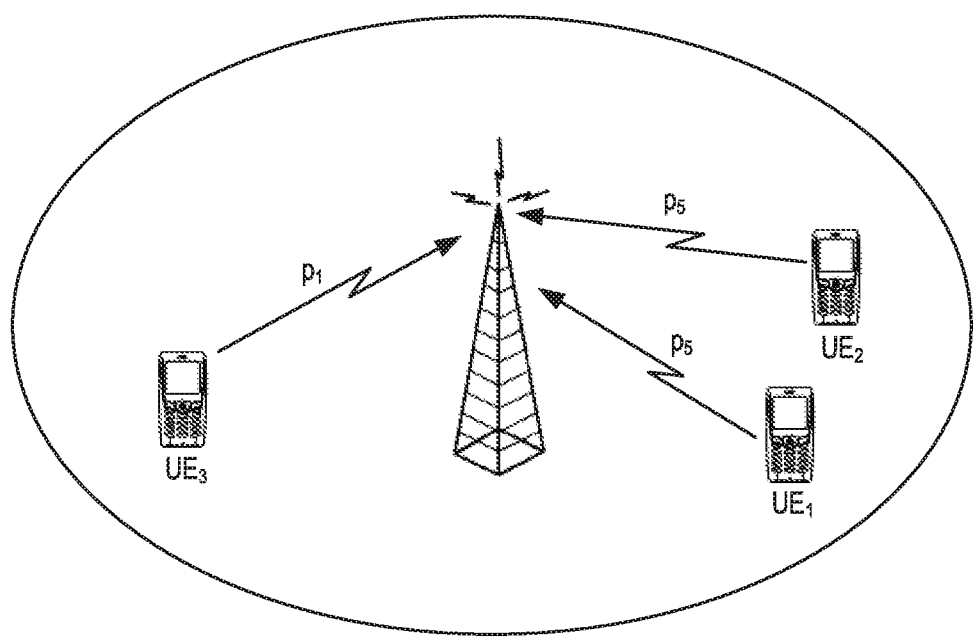
FIG. 3 illustrates contention based random access, where there is contention between UEs.
Figure 4:
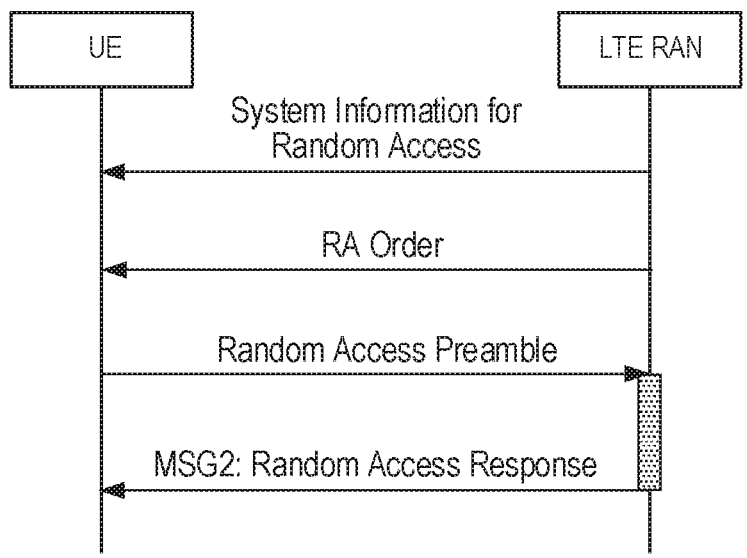
FIG. 4 is a diagram illustrating signaling over the air interface for the contention-free random access procedure in LTE.

LTE random access can be either contention-based or contention-free. The contention-based random access procedure consists of four steps, as illustrated in FIG. 2 and discussed above. Note that only the first step involves physical-layer processing specifically designed for random access, while the remaining three steps follow the same physical-layer processing used in uplink and downlink data transmission. For contention-free random access, the UE uses reserved preambles assigned by the base station. In this case, contention resolution is not needed, and thus only steps 1 and 2 are required. The techniques for random access preamble transmission discussed below may be used in either or both contention-free and contention-based random access procedures.

Figure 6:
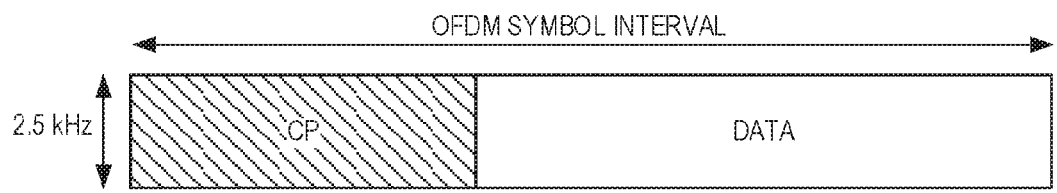
FIG. 6 illustrates an example PRACH signal for one OFDM symbol.

An example PRACH signal during a single OFDM symbol interval, according to some embodiments of the presently disclosed techniques, is shown in FIG. 6. It is basically a single-tone (single-subcarrier) OFDM signal. According to the example in FIG. 6, the subcarrier spacing is 2.5 kHz. However, the techniques described herein may be applied to any subcarrier spacing.

According to some embodiments of the presently disclosed techniques, the PRACH signal is spread in time over multiple OFDM symbols, instead of spread in frequency (as in the LTE case). Thus, a number of OFDM symbols, each one as illustrated in FIG. 6, are concatenated to form a PRACH preamble. As will be discussed in further detail below, in some embodiments the generated random access preamble signal comprises two or more, or N, consecutive preamble symbols, also referred to herein as preamble symbol groups or symbol groups, with each preamble symbol group comprising a plurality of duplicated OFDM symbols and being formed to produce a single tone in the transmitted random access preamble signal. In other words, each preamble symbol group comprises a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency. The subcarrier frequency changes between preamble symbol groups, such that the single tone for a first one of the consecutive symbol groups corresponds to a first subcarrier frequency and the single tone for a subsequent one of the symbol groups corresponds to a second subcarrier frequency. In other words, each preamble symbol group comprises a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency.

In some embodiments, the subcarrier frequencies change according to a simple pattern, where the single tone for every second preamble symbol corresponds to a first subcarrier frequency and the single tone for the remaining preamble symbols corresponds to a second subcarrier frequency. Thus, in these embodiments, the preamble signal hops between two subcarrier frequencies, from one preamble symbol group to the next. It will be appreciated, of course that other patterns are possible.

As explained in further detail below, each of the consecutive preamble symbols may be formed by repeating a basic OFDM symbol a plurality of times. It should be understood that the term symbol group, as used herein, may refer to a preamble symbol group formed in such a manner; thus a preamble symbol does not correspond to a basic OFDM symbol, but instead may comprise a plurality of duplicated OFDM symbols. As noted above, a single-tone OFDM signal is also a SC-FDMA signal, so these duplicated OFDM symbols may also be understood to be SC-FDMA symbols.

Figure 7:
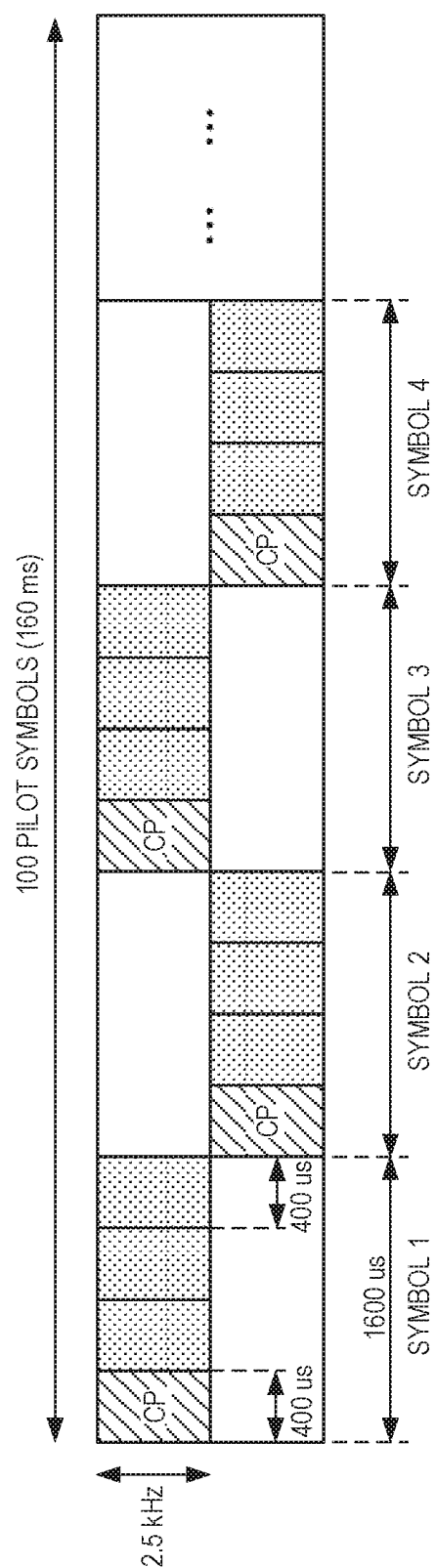
FIG. 7 is a diagram illustrating an example PRACH signal over multiple OFDM symbol intervals, according to some embodiments.

An example random access preamble signal design is shown in FIG. 7. In this example, the PRACH preamble consists of 100 preamble symbols in time and occupies one tone/subcarrier (of 2.5 kHz) in frequency, for any given preamble symbol interval. However, the transmission in this example hops between two adjacent tones from one preamble symbol group to the next. This hopping is used to enable satisfactory time-of-arrival estimation performance at the base station. As noted above, this 2.5 kHz is simply an example—other subcarrier spacings are possible. Further, it should be apparent that the tones need not be adjacent—the hopping can skip several subcarriers.

Since the tone (subcarrier) bandwidth/spacing in this example is 2.5 kHz, the duration of the data part of a normal OFDM symbol would be 400 microseconds, according to the well-known relationship between subcarrier spacing and OFDM symbol length. To support a cell size of up to, for example, 60 km, a CP of length 400 microseconds is needed to accommodate the maximum round-trip delay. A direct transmission of a 400 microsecond data part and a 400 microsecond CP would lead to a 50% CP overhead out of the total resource. To reduce the overhead, a basic OFDM symbol is repeated four times, in the example illustrated in FIG. 7, resulting in a 1600-microsecond symbol duration. The first copy of the OFDM symbol is treated by the base station receiver as CP, while the remaining three copies are treated as data. This design reduces the CP overhead from 50% down to 25%. The base station can coherently combine the three copies of the symbol and thereby obtain about 4.8 dB power gain.

To see the 0 dB PAPR property of the preamble in FIG. 7, consider, without loss of generality, OFDM symbols 1 and 2 that can be written as:

$$x(t) = x[1]e^{j2\pi\frac{k}{T}t}, t \in [0, 4T]$$

$$x(t) = x[2]e^{j2\pi\frac{k+1}{T}t}, t \in [4T, 8T]$$

where T=400 microseconds and k is the subcarrier index, for subcarriers with subcarrier spacings of 1/T. Within each OFDM symbol of length 4 T, the waveform is of constant envelope, since within time intervals [0, 4 T] and [4 T, 8 T] the signal is sinusoidal. At symbol boundary, the phase difference is $$\text{phase}\left(x^*[1]e^{-j2\pi\frac{k}{T}4T}x[2]e^{j2\pi\frac{k+1}{T}4T}\right) = \text{phase}(x^*[1]x[2])$$

Therefore, sending a constant sequence, i.e., where x[1]=x[2], that alternates between the two tones, guarantees phase continuity and yields 0 dB PAPR theoretically.

Figure 8:
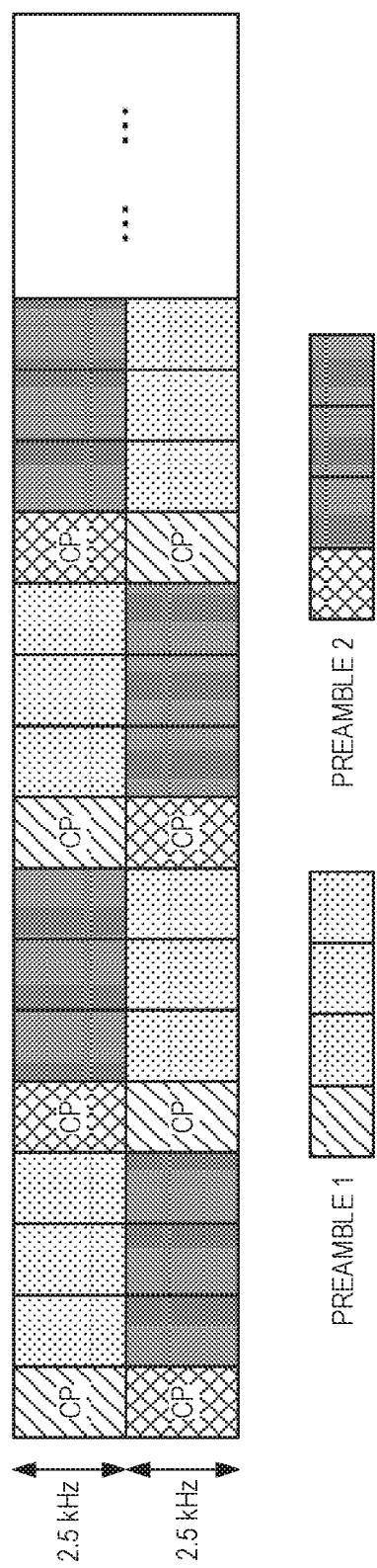
FIG. 8 is a diagram illustrating frequency multiplexing of two PRACH preambles, according to some embodiments.

Since each PRACH preamble effectively only uses one 2.5 kHz subcarrier at any given time, different preambles can be multiplexed in the frequency domain. For example, FIG. 8 shows the multiplexing of two PRACH preambles. In general, M tones can be configured for multiplexing M PRACH preambles. Each PRACH preamble uses one tone during one OFDM symbol interval, and the multiplexing pattern (e.g., as shown in FIG. 8) ensures that no two UEs use the same tone during the same OFDM symbol interval.

Figure 9:
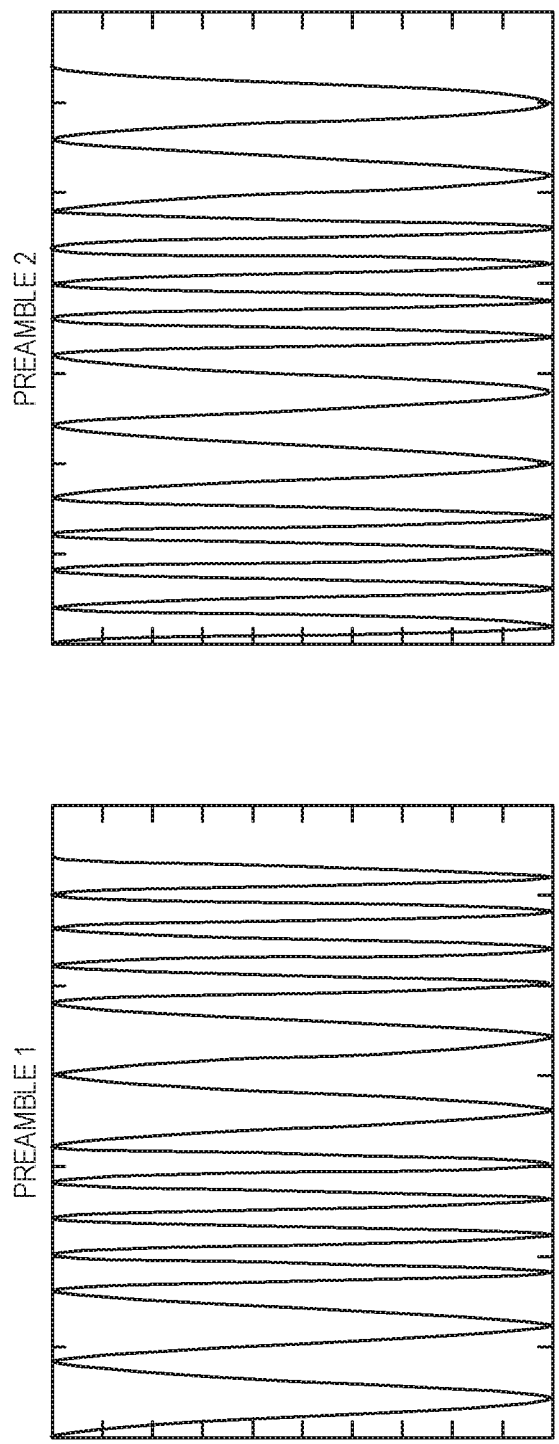
FIG. 9 illustrates frequency multiplexing of two PRACH preambles (time-domain signal), according to some embodiments.

FIG. 8 illustrates the frequency-domain arrangement of the two PRACH preambles. Examples of the corresponding time-domain signals are shown in FIG. 9, where an interval of about four preamble symbol groups is shown for each preamble signal. First, it can be seen that phase-continuity is preserved in each of the preambles. Second, it can be seen that preamble 1 starts with a lower-frequency sinusoidal, switching to a higher-frequency sinusoidal, the lower-frequency sinusoidal, and finally switching again to a higher-frequency sinusoidal. Preamble 2 starts with the higher-frequency sinusoidal, switching to the lower-frequency sinusoidal, higher-frequency sinusoidal, and finally switching again to the lower-frequency sinusoidal. These two preambles are orthogonal to each other if their differential arrival time at the base station is within the CP interval. Note that in both of the illustrated examples, there is phase continuity between the lower-frequency and higher-frequency sinusoids. It will be appreciated that the low-to-high and high-to-low sequences of the two preambles may be pre-configured in each of the radio devices sending the preambles, or may result from a random selection of a configuration by the radio devices.

It will be appreciated that the presently disclosed techniques can be generalized to any CP duration, or any relationship between the CP duration and normal data duration within a preamble symbol group. However, the hopping distance in frequency should be adjusted accordingly, to maintain phase continuity at OFDM symbol boundaries where transitioning between frequency tones occurs. This is important in maintaining the constant envelope property.

Figure 10:
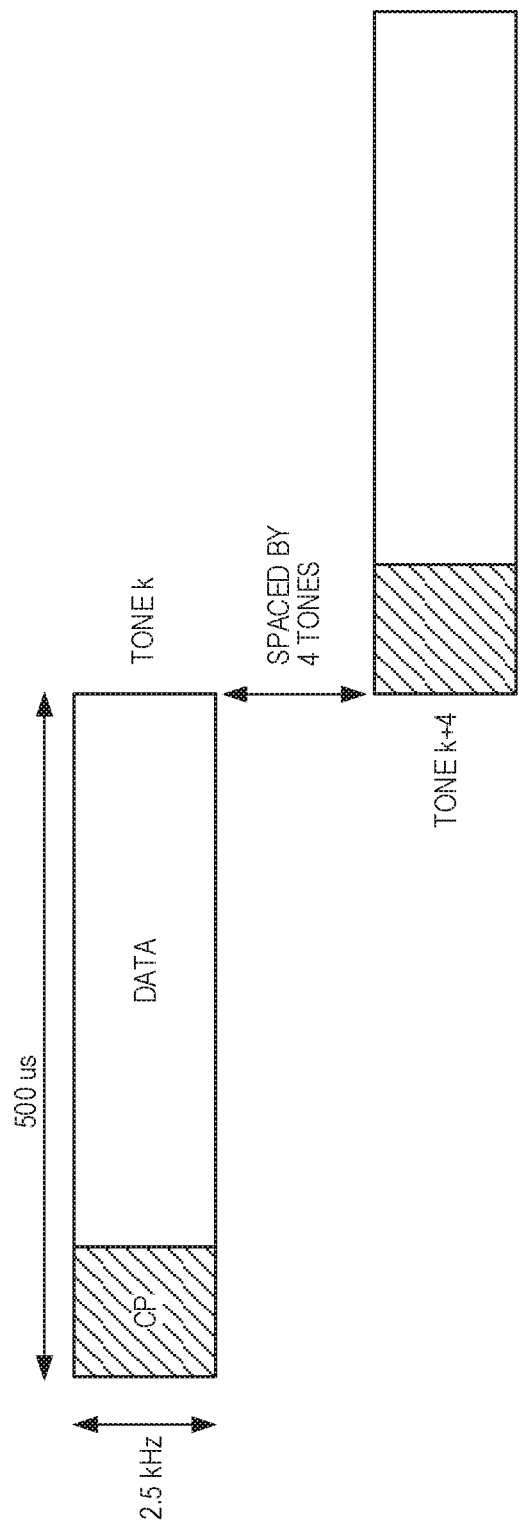
FIG. 10 is a diagram illustrating an example of CP duration that is one fourth of the OFDM data symbol duration, according to some embodiments.

An example is given in FIG. 10. Here the subcarrier spacing (tone bandwidth) is still 2.5 kHz, and thus the nominal data symbol duration (T) is 1/2500, i.e. 400 microseconds, which, in an OFDM context, implies a subcarrier spacing of 2.5 kHz. As shown, the CP is 100 us, and thus is one fourth of the nominal data symbol duration. Note that the OFDM symbol duration is thus 1.25 T (CP plus data). Consider OFDM symbols 1 and 2, which can be written as $$x(t) = x[1]e^{j2\pi\frac{k}{T}t}, t \in [0, 1.25T]$$

$$x(t) = x[2]e^{j2\pi\frac{k+4}{T}t}, t \in [1.25T, 2.5T]$$

where T=400 us. Within each OFDM symbol of length 1.25 T, the waveform is of constant envelope. At symbol boundary, the phase difference is $$\text{phase}\left(x^*[1]e^{-j2\pi\frac{k}{T}(1.25T)}x[2]e^{j2\pi\frac{k+4}{T}(1.25T)}\right) = \text{phase}(x^*[1]x[2])$$

Therefore, sending a constant sequence, i.e., where x[1]=x[2], that alternates between two subcarriers that are 4 tones apart, guarantees phase continuity and yields 0 dB PAPR theoretically.

Figure 11:
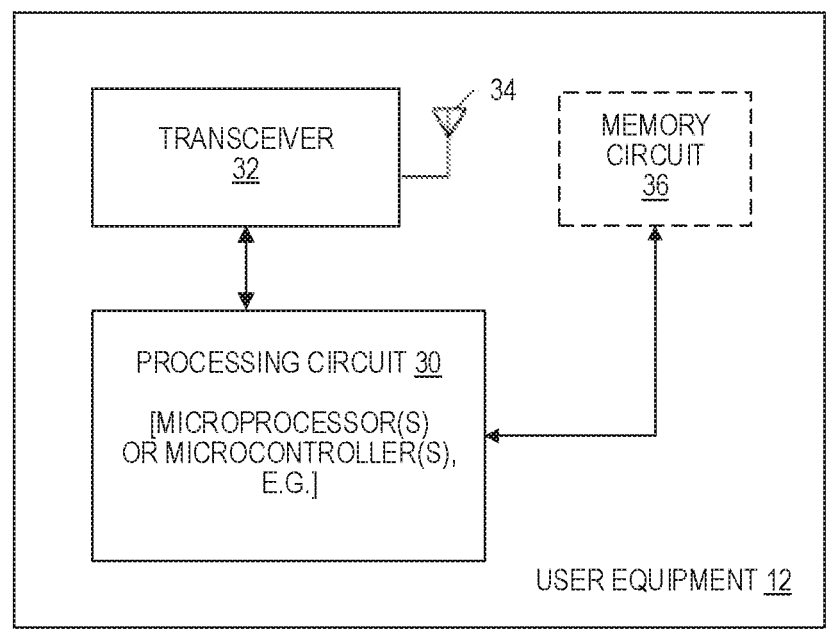
FIG. 11 is a block diagram of a user equipment configured to perform a random access procedure, according to some embodiments.

FIG. 11 shows an example radio device, here illustrated as a UE 12, which may be more generally referred to a wireless terminal and which can be used in one or more of the example embodiments described herein. The UE 12 may in some embodiments be a mobile device that is configured for operation according to specifications for NB-IoT. The UE 12 comprises a processing circuit 30 that controls the operation of the UE 12. The processing circuit 30, which may comprise one or more microprocessors, microcontrollers, digital signal processors, specialized digital logic, etc., for example, is connected to a receiver or transceiver circuit 32 with associated antenna(s) 34, which are used to receive signals from or both transmit signals to and receive signals from a base station 10 in the network 2. The UE 12 also comprises a memory circuit 36 that is connected to the processing circuit 30 and that stores program code and other information and data required for the operation of the UE 12. Together, the processing circuit 30 and memory circuit 36 may also be referred to as a processing circuit, and are adapted, in various embodiments, to carry out one or more of the UE-based techniques described herein.

For example, the processing circuit of UE 12 may be configured to generate a SC-FDMA random access preamble signal comprising two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency. The processing circuit of UE 12 is further configured to transmit the random access preamble signal. As discussed in the examples described above, the single subcarrier for at least one of the preamble symbol groups corresponds to a first subcarrier frequency and the single subcarrier for an immediately subsequent one of the preamble symbol groups corresponds to a second subcarrier frequency. In some embodiments, every second one of the preamble symbol groups corresponds to the second subcarrier frequency and each of the remaining preamble symbol groups corresponds to the first subcarrier frequency.

Figure 12:
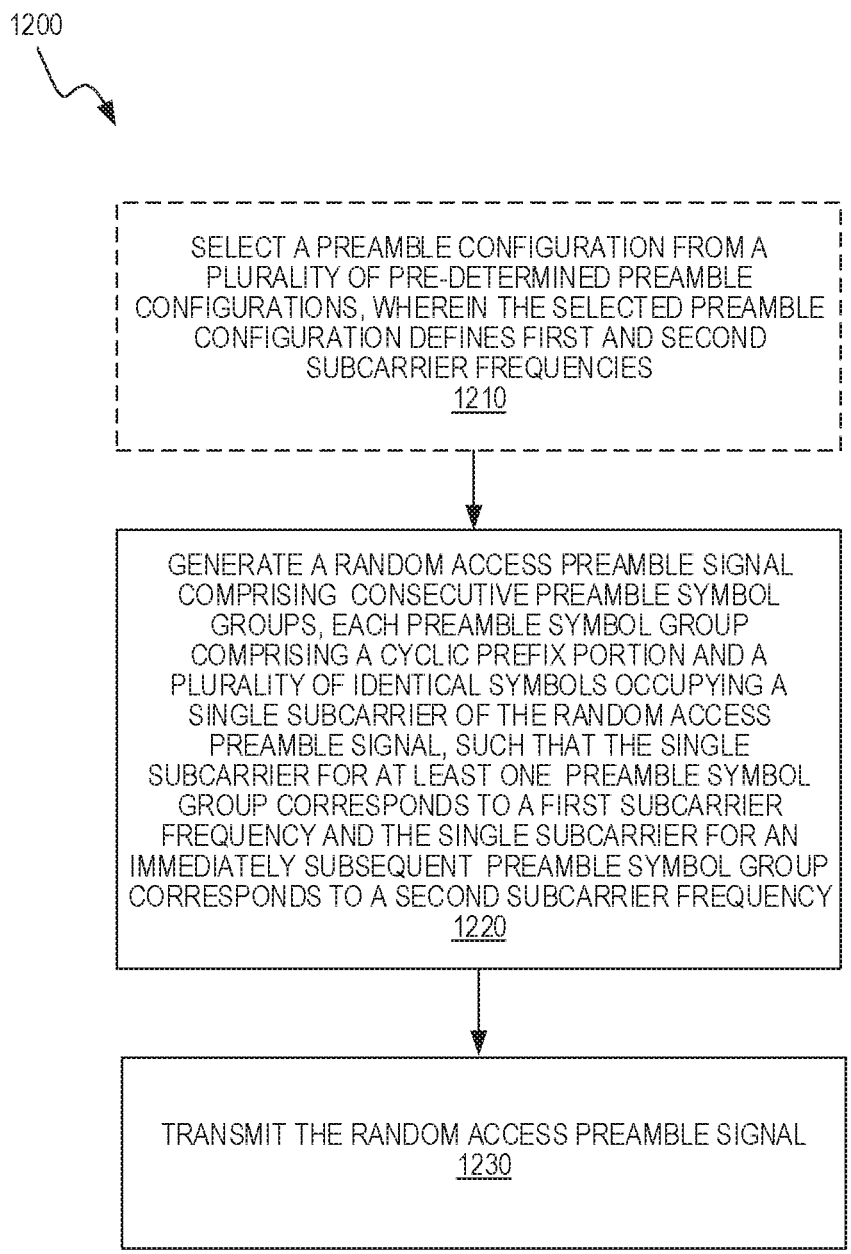
FIG. 12 is a flowchart illustrating a method in a user equipment for performing a random access procedure, according to some embodiments.

Regardless of the implementation, the processing circuit of UE 12 is configured to perform a method 1200 as shown in FIG. 12. As shown at block 1220, the method 1200 includes generating an SC-FDMA random access preamble signal comprising two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency; in some embodiments, every second one of the preamble symbol groups corresponds to the second subcarrier frequency and each of the remaining preamble symbol groups corresponds to the first subcarrier frequency. The method 1200 also includes transmitting the random access preamble signal, as shown at block 1230. In some cases, the method 1200 may include selecting a preamble configuration from a plurality of pre-determined preamble configurations, where the selected preamble configuration defines the first and second subcarrier frequencies, as shown at block 1210, and where the SC-FDMA random access preamble signal is generated using the selected preamble configuration. This selection may be performed randomly, in some embodiments.

In some embodiments, all of the preamble symbol groups have the same complex amplitude. In some embodiments, the first and second subcarrier frequencies are selected so as to enable phase continuity at the boundaries between preamble symbols. The preamble symbol groups are then generated so as to provide phase continuity at the boundaries between preamble symbol groups.

In some embodiments, the second subcarrier frequency is adjacent to the first subcarrier frequency. In some of these and in other embodiments, the length of the cyclic prefix portion is the same as the length of each of the identical symbols, and the cyclic prefix portion is identical to each of the identical symbols. In others, the length of the cyclic prefix portion is one quarter of the length of each of the identical symbols.

In some embodiments, each preamble symbol group has a total length of 1600 microseconds. In some embodiments, the plurality of identical symbols in each preamble symbol group consists of three identical symbols.

Figure 13:
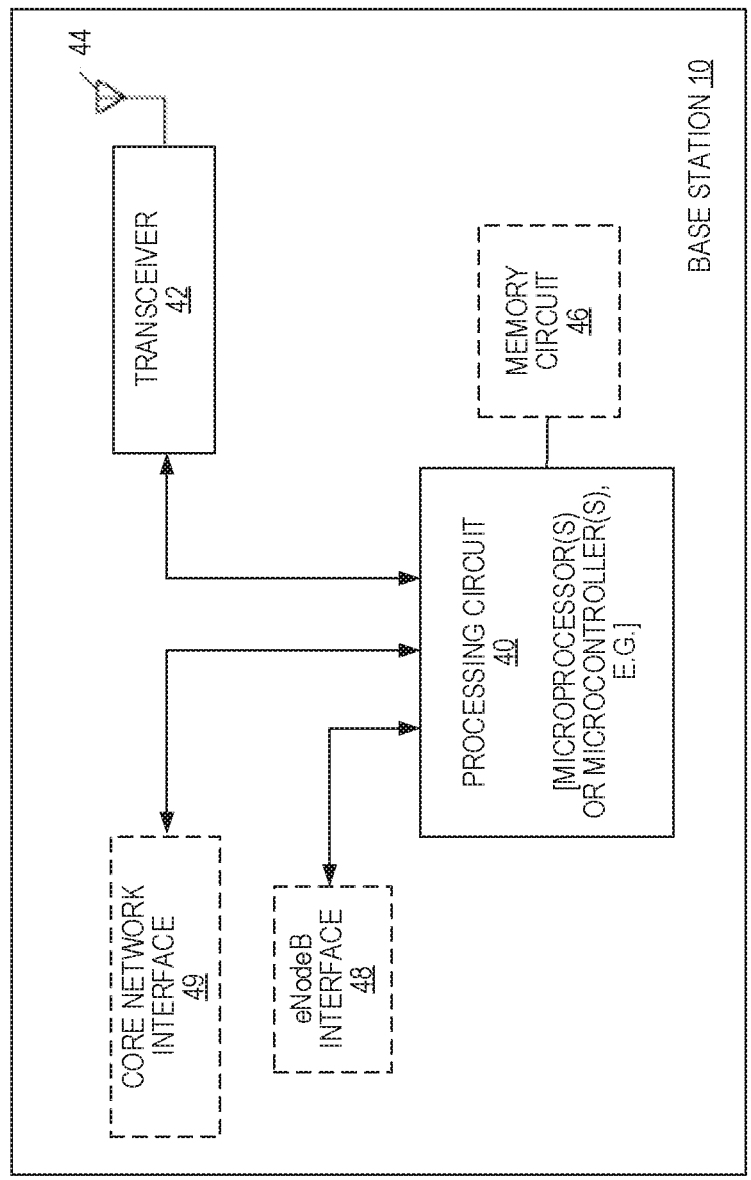
FIG. 13 is a block diagram of a network node configured to signal information pertaining to a random access procedure, according to some embodiments.

FIG. 13 shows another example radio device, in this case illustrating a network node, such as a base station 10, that is configured to receive a random access preamble signal from the UE 12. In the description of some embodiments below, the terminology "radio network node" or simply "network node" or "NW node" is used. These terms refer to any kind of network node in the fixed portion of the wireless communication network, such as a base station, a radio base station, a base transceiver station, a base station controller, a network controller, an evolved Node B (eNodeB or eNB), a Node B, a relay node, a positioning node, a E-SMLC, a location server, a repeater, an access point, a radio access point, a Remote Radio Unit (RRU) Remote Radio Head (RRH), a multi-standard radio (MSR) radio node such as MSR base station nodes in distributed antenna system (DAS), a SON node, an O&M, OSS, or MDT node, a core network node, an MME, etc. As can be seen from these example, the term "fixed portion" of the wireless communication network is meant to refer to the portion of the wireless network other than the access terminals, i.e., the portion of the network that is accessed through a radio link by UEs, NT-IoB devices, and the like, and is not meant to preclude the possibility that one or more elements in a given scenario can be moved.

FIG. 13 shows a base station 10 (for example an eNB) that can be used in some of the example embodiments described herein. It will be appreciated that although a macro eNB will not, in practice, be identical in size and structure to a micro eNB, for the purposes of illustration, the base stations 10 are assumed to include similar components. Thus, whether or not base station 10 corresponds to a macro base station or a micro base station, it comprises a processing circuit 40 that controls the operation of the base station 10. The processing circuit 40, which may include one or more microprocessors, microcontrollers, digital signal processors, specialized digital logic, etc., is connected to a transceiver circuit 42 with associated antenna(s) 44 that are used to transmit signals to, and receive signals from, UEs 12 in the network. The base station 10 also comprises a memory circuit 46 that is connected to the processing circuit 40 and that stores program and other information and data required for the operation of the base station 10. Together, the processing circuit 40 and memory circuit 46 may also be referred to as a processing circuit, and are adapted, in various embodiments, to carry out one or more of the network-based techniques described below.

Base station 10 also includes components and/or circuitry 48 for allowing the base station 10 to exchange information with other base stations 10 (for example, via an X2 interface) and components and/or circuitry 49 for allowing the base station 10 to exchange information with nodes in the core network (for example, via an S1 interface). It will be appreciated that base stations for use in other types of network (e.g., UTRAN or Wideband Code Division Multiple Access or WCDMA RAN) will include similar components to those shown in FIG. 13 and appropriate interface circuitry 48, 49 for enabling communications with the other network nodes in those types of networks (e.g., other base stations, mobility management nodes and/or nodes in the core network).

The processing circuit of base station 10 is configured to receive a radio-frequency signal and detect, in the radio-frequency signal, a first SC-FDMA random access preamble signal, transmitted by a first remote radio device. The first SC-FDMA random access preamble signal comprises two or more consecutive preamble symbols (which may also be referred to as preamble symbol groups), each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency. In some embodiments, every second one of the preamble symbol groups corresponds to the second subcarrier frequency and each of the remaining preamble symbol groups corresponds to the first subcarrier frequency. In some cases, the processing circuit is configured to estimate a time-of-arrival for the first preamble signal.

Figure 14:
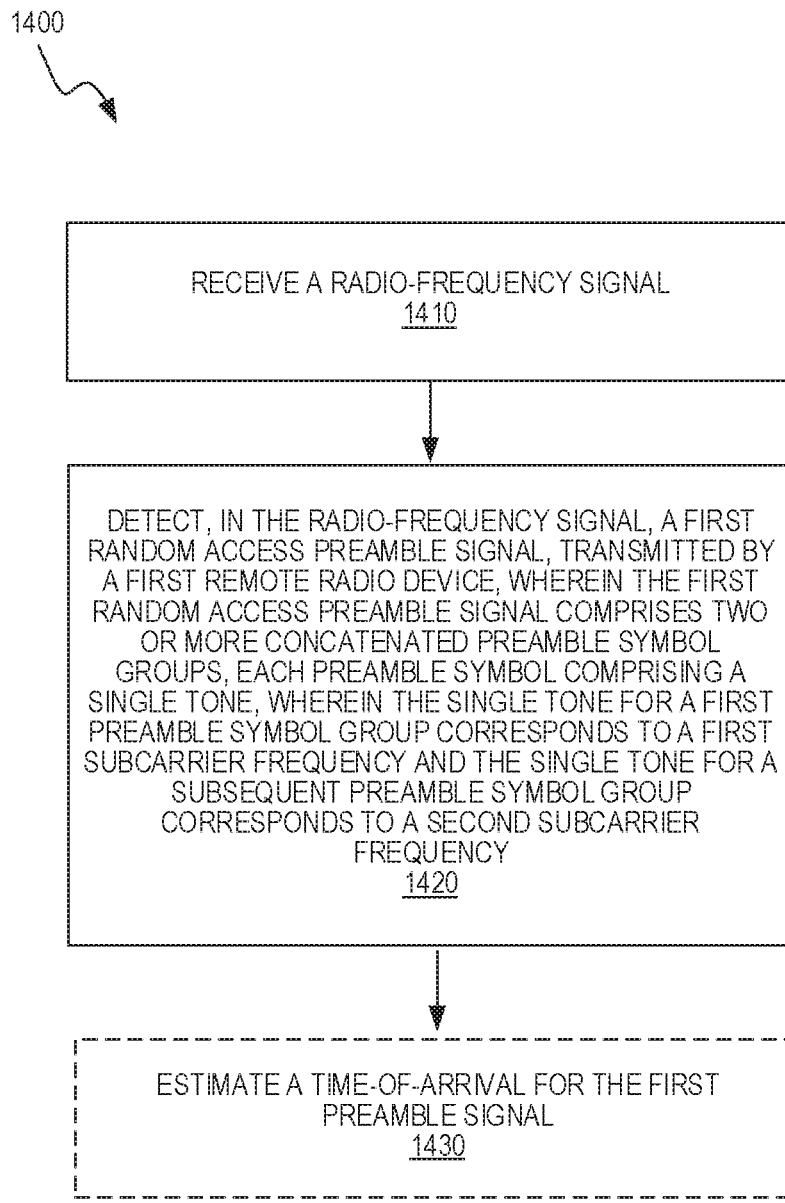
FIG. 14 is a flowchart illustrating a random access procedure, according to some embodiments.

Regardless of the implementation, the processing circuit of base station 10 is also configured to perform a method 1400, as shown in FIG. 14. The method 1400 includes receiving a radio-frequency signal (Block 1410). The method 1400 also includes detecting, in the radio-frequency signal, a first SC-FDMA random access preamble signal, transmitted by a first remote radio device (Block 1420). The first random access preamble signal comprises two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency. Again, in some embodiments, every second one of the preamble symbol groups corresponds to the second subcarrier frequency and each of the remaining preamble symbol groups corresponds to the first subcarrier frequency. Optionally, the method 1400 includes estimating a time-of-arrival for the first SC-FDMA random access preamble signal (Block 1430)—this may be used for performing uplink synchronization, for example.

In some embodiments, all of the preamble symbol groups have the same complex amplitude. Further, the first and second subcarrier frequencies may be selected so as to enable phase continuity at the boundaries between preamble symbol groups, where the detected preamble symbols have phase continuity at the boundaries between preamble symbol groups. In some embodiments, the second subcarrier frequency is adjacent to the first subcarrier frequency.

In some embodiments, the length of the cyclic prefix portion is the same as the length of each of the identical symbols and the cyclic prefix portion is identical to each of the identical symbols. In other embodiments, the length of the cyclic prefix is one quarter of the length of each of the identical symbols. In some embodiments, each preamble symbol group has a total length of 1600 microseconds; the plurality of identical symbols in each preamble symbol group consists of three identical symbols, in some embodiments.

As discussed above, different random access preamble signals may be interleaved in the frequency domain, such that they may be distinguished from one another by the base station. Accordingly, some embodiments of the method 1400 may further comprise detecting, in the radio-frequency signal, a second SC-FDMA random access preamble signal, transmitted by a second remote user equipment, where the second SC-FDMA random access preamble signal comprises two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a third subcarrier frequency and the single subcarrier for an immediately subsequent one of the preamble symbol groups corresponds to a fourth subcarrier frequency. In these embodiments, the two or more consecutive preamble symbol groups of the second SC-FDMA random access preamble signal may overlap, at least partly, the two or more consecutive preamble symbol groups of the first SC-FDMA random access preamble, and the first subcarrier frequency may equal the fourth subcarrier frequency, or the second subcarrier frequency may equal the third subcarrier frequency, or both.

It should be understood that the methods 1200 and 1400 illustrated in FIGS. 12 and 14 are examples of the techniques described more fully above. Each of these methods may be modified according to any of the variations and details discussed. The methods illustrated in FIGS. 12 and 14, and variants thereof, may be implemented using the processing circuits illustrated in FIGS. 11 and 13, as appropriate, where the processing circuits are configured, e.g., with appropriate program code stored in memory circuits 36, and/or 46, to carry out the operations described above. While some of these embodiments are based on a programmed microprocessor or other programmed processing element, it will be appreciated that not all of the steps of these techniques are necessarily performed in a single microprocessor or even in a single module. Embodiments of the presently disclosed techniques further include computer program products for application in a wireless terminal as well as corresponding computer program products for application in a base station apparatus or other network node apparatus.

This program code or computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) running on a processor such as a digital signal processor, which may collectively be referred to as "circuitry," "a module" or variants thereof.

It will further be appreciated that various aspects of the above-described embodiments can be understood as being carried out by functional "modules," which may be program instructions executing on an appropriate processor circuit, hard-coded digital circuitry and/or analog circuitry, or appropriate combinations thereof.

Figure 15:
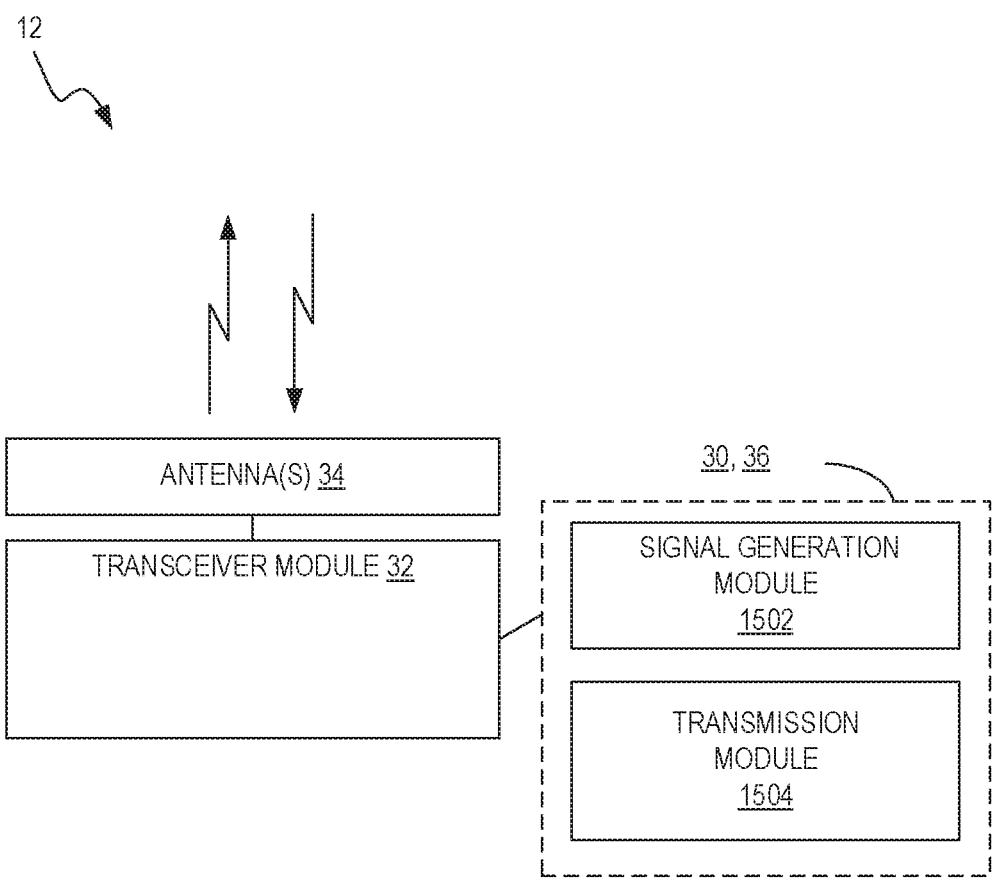
FIG. 15 is a block diagram of a functional implementation of a user equipment for performing a random access procedure, according to some embodiments.

For example, FIG. 15 illustrates an example functional module or circuit architecture as may be implemented in a UE 12, e.g., based on the processing circuit 30 and memory circuit 36. The illustrated embodiment at least functionally includes a signal generation module 1502 for generating a random access preamble signal. The implementation also includes a transmission module 1504 for transmitting the random access preamble signal. The generated random access signal comprises two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency. In some embodiments, every second one of the preamble symbol groups corresponds to the second subcarrier frequency and each of the remaining preamble symbol groups corresponds to the first subcarrier frequency.

Figure 16:
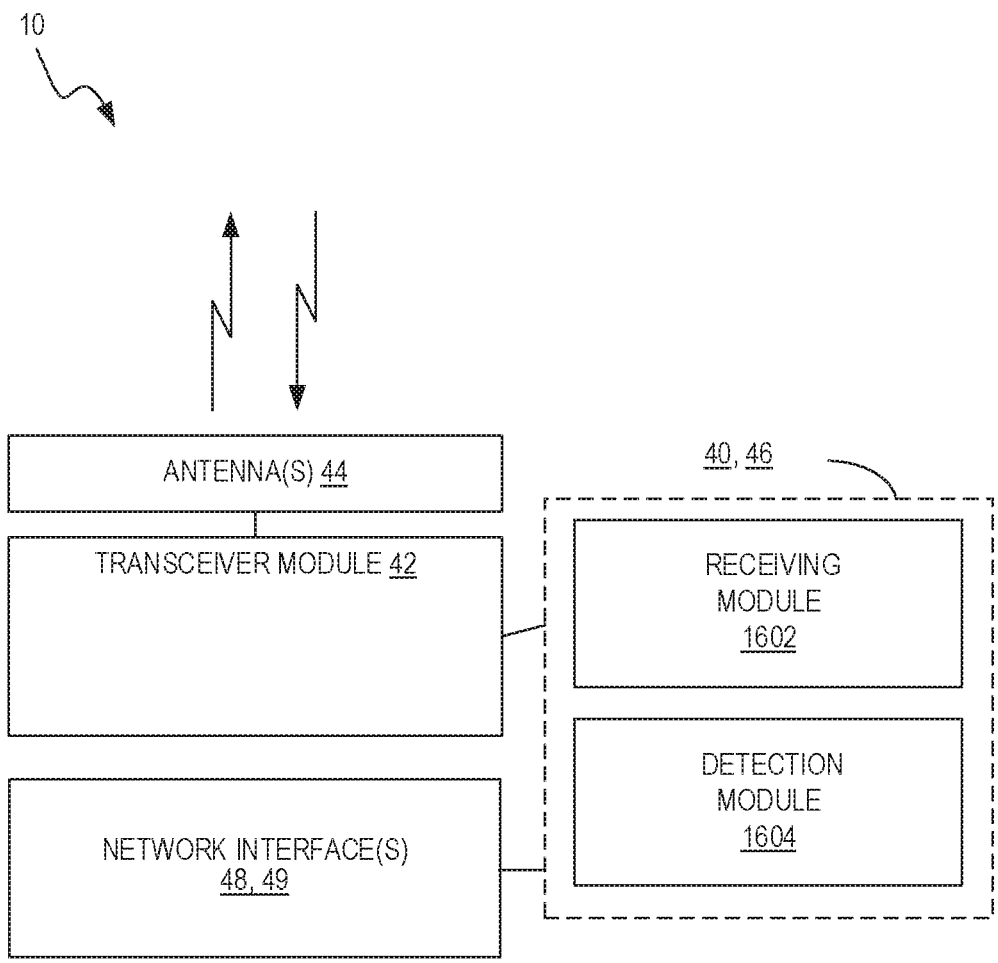
FIG. 16 is a block diagram of a functional implementation of a network node for receiving reports pertaining to a random access procedure, according to some embodiments.

FIG. 16 illustrates an example functional module or circuit architecture as may be implemented in a network node, such as a base station 10, e.g., based on the processing circuit 40 and memory circuit 46. The illustrated embodiment at least functionally includes a receiving module 1602 for receiving a radio-frequency signal. The implementation also includes a detection module 1604 for detecting, in the radio-frequency signal, a first SC-FDMA random access preamble signal, transmitted by a first remote radio device. The first random access preamble signal comprises two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency. In some embodiments, for example, every second one of the preamble symbol groups corresponds to the second subcarrier frequency and each of the remaining preamble symbol groups corresponds to the first subcarrier frequency.

Modifications and other variants of the described embodiment(s) will come to mind to one skilled in the art having the benefit of the teachings presented in the foregoing descriptions and the associated figures. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Example embodiments are listed below. It should be understood that these are examples only; other embodiments and variants of the listed embodiments will be apparent from the detailed description provided above. Embodiments of the techniques and apparatus described above include, but are not limited to, the following enumerated examples.

EXAMPLE 1

A method, in a radio device, the method comprising: generating a random access preamble signal; and transmitting the random access preamble signal; wherein generating the random access preamble signal comprises concatenating N preamble symbols, each preamble symbol comprising a single tone, wherein the single tone for every second preamble symbol corresponds to a first subcarrier frequency and the single tone for the remaining preamble symbols corresponds to a second subcarrier frequency.

EXAMPLE 2

The method of example 1, wherein all of the preamble symbols have the same complex amplitude, wherein the first and second subcarrier frequencies are selected so as to enable phase continuity at the boundaries between preamble symbols, and wherein the preamble symbols are generated so as to provide phase continuity at the boundaries between preamble symbols.

EXAMPLE 3

The method of example 1 or 2, wherein each preamble symbol has a cyclic prefix portion and a subsequent data portion, the cyclic prefix portion having a first length and being a duplicate of a concluding part of the subsequent data portion.

EXAMPLE 4

The method of example 3, wherein the subsequent data portion consists of three identical copies of the cyclic prefix portion.

EXAMPLE 5

The method of example 4, wherein each preamble symbol has a total length of 1600 microseconds and the first and second subcarrier frequencies differ by 2500 Hertz.

EXAMPLE 6

The method of example 3, wherein the subsequent data portion has a second length, the second length being four times the first time.

EXAMPLE 7

The method of example 6, wherein each preamble symbol has a total length of 500 microseconds and wherein the first and second subcarrier frequencies differ by 10 kHz.

EXAMPLE 8

The method of any of examples 1-7, wherein N=100.

EXAMPLE 9

The method of any of examples 1-8, the method further comprising selecting a preamble configuration from a plurality of pre-determined preamble configurations, wherein the selected preamble configuration defines the first and second subcarrier frequencies.

EXAMPLE 10

A method, in a radio device, the method comprising: receiving a radio-frequency signal; and detecting, in the radio-frequency signal, a first random access preamble signal, transmitted by a first remote radio device, wherein the first random access preamble signal comprises N concatenated preamble symbols, each preamble symbol comprising a single tone, wherein the single tone for every second one of the N preamble symbols corresponds to a first subcarrier frequency and the single tone for the remaining preamble symbols corresponds to a second subcarrier frequency.

EXAMPLE 11

The method of example 10, wherein all of the preamble symbols have the same complex amplitude, wherein the first and second subcarrier frequencies are selected so as to enable phase continuity at the boundaries between preamble symbols, and wherein the detected preamble symbols have phase continuity at the boundaries between preamble symbols.

EXAMPLE 12

The method of example 10 or 11, wherein each preamble symbol has a cyclic prefix portion and a subsequent data portion, the cyclic prefix portion having a first length and being a duplicate of a concluding part of the subsequent data portion.

EXAMPLE 13

The method of example 12, wherein the subsequent data portion consists of three identical copies of the cyclic prefix portion, and wherein detecting the first random access preamble signal comprises coherently combining three consecutive intervals in each preamble symbol.

EXAMPLE 14

The method of example 13, wherein each preamble symbol has a total length of 1600 microseconds and the first and second subcarrier frequencies differ by 2500 Hertz.

EXAMPLE 15

The method of example 12, wherein the subsequent data portion has a second length, the second length being four times the first time.

EXAMPLE 16

The method of example 15, wherein each preamble symbol has a total length of 500 microseconds and wherein the first and second subcarrier frequencies differ by 10 kHz.

EXAMPLE 17

The method of any of examples 10-16, wherein N=100.

EXAMPLE 18

The method of any of examples 10-17, the method further comprising estimating a time-of-arrival for the first preamble signal.

EXAMPLE 19

The method of any of examples 10-18, further comprising detecting, in the radio-frequency signal, a second random access preamble signal, transmitted by a second remote radio device, wherein: the second random access preamble signal comprises N concatenated preamble symbols, each preamble symbol of the second random access preamble signal comprising a single tone; wherein the single tone for every second one of the N preamble symbols of the second random access preamble corresponds to a third subcarrier frequency and the single tone for the remaining preamble symbols of the second random access preamble corresponds to a fourth subcarrier frequency; wherein the N preamble symbols of the second random access preamble overlap, at least partly, the N preamble symbols of the first random access preamble; and wherein the first subcarrier frequency equals the fourth subcarrier frequency, or the second subcarrier frequency equals the third subcarrier frequency, or both.

EXAMPLE 20

A radio device comprising a radio transceiver adapted to communicate with another radio device and further comprising one or more processing circuits adapted to carry out the method of any of examples 1-9.

EXAMPLE 21

A radio device comprising a radio transceiver adapted to communicate with another radio device and further comprising one or more processing circuits adapted to carry out the method of any of examples 10-19.

EXAMPLE 22

A radio device adapted to: generate a random access preamble signal by concatenating N preamble symbols, each preamble symbol comprising a single tone, wherein the single tone for every second preamble symbol corresponds to a first subcarrier frequency and the single tone for the remaining preamble symbols corresponds to a second subcarrier frequency; and transmit the random access preamble signal.

EXAMPLE 23

A radio device comprising: a signal generation module for generating a random access preamble signal by concatenating N preamble symbols, each preamble symbol comprising a single tone, wherein the single tone for every second preamble symbol corresponds to a first subcarrier frequency and the single tone for the remaining preamble symbols corresponds to a second subcarrier frequency module; and a transmission module for transmitting the random access preamble signal.

EXAMPLE 24

A radio device adapted to: receive a radio-frequency signal; and detect, in the radio-frequency signal, a first random access preamble signal, transmitted by a first remote radio device, wherein the first random access preamble signal comprises N concatenated preamble symbols, each preamble symbol comprising a single tone, wherein the single tone for every second one of the N preamble symbols corresponds to a first subcarrier frequency and the single tone for the remaining preamble symbols corresponds to a second subcarrier frequency.

EXAMPLE 25

A radio device, comprising: a receiving module for receiving a radio-frequency signal; and a detection module for detecting, in the radio-frequency signal, a first random access preamble signal, transmitted by a first remote radio device, wherein the first random access preamble signal comprises N concatenated preamble symbols, each preamble symbol comprising a single tone, wherein the single tone for every second one of the N preamble symbols corresponds to a first subcarrier frequency and the single tone for the remaining preamble symbols corresponds to a second subcarrier frequency.

EXAMPLE 26

A computer program product comprising program instructions for a processor in a radio device, wherein said program instructions are configured so as to cause the radio device when the program instructions are executed by the processor, to: generate a random access preamble signal by concatenating N preamble symbols, each preamble symbol comprising a single tone, wherein the single tone for every second preamble symbol corresponds to a first subcarrier frequency and the single tone for the remaining preamble symbols corresponds to a second subcarrier frequency; and transmit the random access preamble signal.

EXAMPLE 27

A non-transitory computer-readable medium comprising, stored thereupon, the computer program product of example 26.

EXAMPLE 28

A computer program product comprising program instructions for a processor in a radio device, wherein said program instructions are configured so as to cause the radio device when the program instructions are executed by the processor, to: receive a radio-frequency signal; and detect, in the radio-frequency signal, a first random access preamble signal, transmitted by a first remote radio device, wherein the first random access preamble signal comprises N concatenated preamble symbols, each preamble symbol comprising a single tone, wherein the single tone for every second one of the N preamble symbols corresponds to a first subcarrier frequency and the single tone for the remaining preamble symbols corresponds to a second subcarrier frequency.

EXAMPLE 29

A non-transitory computer-readable medium comprising, stored thereupon, the computer program product of example 28.

A draft of a contribution to standardization efforts in 3GPP has been developed, and was included as a part of the provisional patent application to which the present application claim claims priority. The entirety of that draft contribution, labeled "Appendix A" in the provisional application, is incorporated by reference herein, for the purpose of providing non-limiting examples of how the inventive techniques described herein may be applied, and in particular to provide illustrative examples of the nature of changes that might be made to wireless communications standards, based on these inventive techniques.

Several methods, devices, and systems for generating and receiving random access preambles have been described in detail above. It will be appreciated by persons of ordinary skill in the art that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method, in a user equipment, the method comprising:
generating a Single-Carrier Frequency-Division Multiple Access (SC-FDMA) random access preamble signal comprising two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency; and
transmitting the SC-FDMA random access preamble signal.

2. The method of claim 1, wherein the second subcarrier frequency is adjacent to the first subcarrier frequency.

3. The method of claim 1, wherein phase continuity exists at the boundary between the at least one of the preamble symbol groups and the immediately subsequent one of the preamble symbol groups.

4. The method of claim 1, wherein all of the preamble symbol groups in the SC-FDMA random access preamble signal have the same complex amplitude.

5. The method of claim 1, wherein the length of the cyclic prefix portion is the same as the length of each of the identical symbols, and the cyclic prefix portion is identical to each of the identical symbols.

6. The method of claim 1, wherein the length of the cyclic prefix portion is one quarter of the length of each of the identical symbols.

7. The method of claim 1, wherein each preamble symbol group has a total length of 1600 microseconds.

8. The method of claim 1, the method further comprising generating the SC-FDMA random access preamble signal using a preamble configuration selected from a plurality of pre-determined preamble configurations, wherein the selected preamble configuration defines at least the first and second subcarrier frequencies.

9. A method, in a base station, the method comprising:
receiving a radio-frequency signal; and
detecting, in the radio-frequency signal, a first Single-Carrier Frequency-Division Multiple Access (SC- FDMA) random access preamble signal, transmitted by a first remote user equipment, wherein the first SC-FDMA random access preamble signal comprises two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency.

10. The method of claim 9, wherein the second subcarrier frequency is adjacent to the first subcarrier frequency.

11. The method of claim 9, wherein phase continuity exists at the boundary between the at least one of the preamble symbol groups and the immediately subsequent one of the preamble symbol groups.

12. The method of claim 9, wherein all of the preamble symbol groups in the SC-FDMA random access preamble signal have the same complex amplitude.

13. A user equipment comprising:
one or more processing circuits configured to generate a Single-Carrier Frequency-Division Multiple Access (SC-FDMA) random access preamble signal comprising two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency, and a radio transceiver configured to transmit the SC-FDMA random access preamble signal from the user equipment to a base station.

14. The user equipment of claim 13, wherein the second subcarrier frequency is adjacent to the first subcarrier frequency.

15. The user equipment of claim 13, wherein the one or more processing circuits are configured to generate the SC-FDMA random access preamble signal such that phase continuity exists at the boundary between the at least one of the preamble symbol groups and the immediately subsequent one of the preamble symbol groups.

16. The user equipment of claim 13, wherein the one or more processing circuits are configured to generate the SC-FDMA random access preamble signal such that all of the preamble symbol groups in the SC-FDMA random access preamble signal have the same complex amplitude.

17. The user equipment of claim 13, wherein the one or more processing circuits are configured to generate the SC-FDMA random access preamble signal such that the length of the cyclic prefix portion is the same as the length of each of the identical symbols and the cyclic prefix portion is identical to each of the identical symbols.

18. The user equipment of claim 13, wherein the one or more processing circuits are configured to generate the SC-FDMA random access preamble signal such that the length of the cyclic prefix is one quarter of the length of each of the identical symbols.

19. The user equipment of claim 13, wherein each preamble symbol group has a total length of 1600 microseconds.

20. The user equipment of claim 13, wherein the one or more processing circuits are further configured to generating the SC-FDMA random access preamble signal using a preamble configuration selected from a plurality of predetermined preamble configurations, wherein the selected preamble configuration defines at least the first and second subcarrier frequencies.

21. A base station comprising:
a radio transceiver configured to communicate with one or more remote user equipments;
and one or more processing circuits configured to:
receive a radio-frequency signal, using the radio transceiver; and
detect, in the radio-frequency signal, a first Single-Carrier Frequency-Division Multiple Access (SC-FDMA) random access preamble signal, transmitted by a first remote user equipment, wherein the first SC-FDMA random access preamble signal comprises two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a first subcarrier frequency and the single subcarrier for an immediately subsequent one of the preamble symbol groups corresponds to a second subcarrier frequency.

22. The base station of claim 21, wherein the second subcarrier frequency is adjacent to the first subcarrier frequency.

23. The base station of claim 21, wherein phase continuity exists at the boundary between the at least one of the preamble symbol groups and the immediately subsequent one of the preamble symbol groups.

24. The base station of claim 21, wherein all of the preamble symbol groups in the SC-FDMA random access preamble signal have the same complex amplitude.

25. The base station of claim 21, wherein the length of the cyclic prefix portion is the same as the length of each of the identical symbols and the cyclic prefix portion is identical to each of the identical symbols.

26. The base station of claim 21, wherein the length of the cyclic prefix is one quarter of the length of each of the identical symbols.

27. The base station of claim 21, wherein each preamble symbol group has a total length of 1600 microseconds.

28. The base station of claim 21, wherein the one or more processing circuits are further configured to estimate a time-of-arrival for the first preamble signal.

29. The base station of claim 21, wherein the one or more processing circuits are further configured to detect, in the radio-frequency signal, a second SC-FDMA random access preamble signal, transmitted by a second remote user equipment, wherein:
the second SC-FDMA random access preamble signal comprises two or more consecutive preamble symbol groups, each preamble symbol group comprising a cyclic prefix portion and a plurality of identical symbols occupying a single subcarrier of the SC-FDMA random access preamble signal, such that the single subcarrier for at least one of the preamble symbol groups corresponds to a third subcarrier frequency and the single subcarrier for an immediately subsequent one of the preamble symbol groups corresponds to a fourth subcarrier frequency;
wherein the two or more consecutive preamble symbol groups of the second SC-FDMA random access preamble signal overlap, at least partly, the two or more consecutive preamble symbol groups of the first SC-FDMA random access preamble; and wherein the first subcarrier frequency equals the fourth subcarrier frequency, or the second subcarrier frequency equals the third subcarrier frequency, or both.

* * * * *

UNITED STATES PATENT AND TRADEMARK OFFICE
CERTIFICATE OF CORRECTION

PATENT NO. : 9,723,634 B2
APPLICATION NO. : 15/277386
DATED : August 1, 2017
INVENTOR(S) : Lin et al.

Page 1 of 1

It is certified that error appears in the above-identified patent and that said Letters Patent is hereby corrected as shown below:

In Column 9, Line 41, delete "a nd a" and insert -- and a --, therefor.

In Column 12, Line 52, delete "NT-IoB" and insert -- NB-IoT --, therefor.

In Column 21, Line 67, in Claim 20, delete "generating" and insert -- generate --, therefor.

Signed and Sealed this
Seventeenth Day of July, 2018

Andrei Iancu
*Director of the United States Patent and Trademark Office*